(12) United States Patent
Severino

(10) Patent No.: US 8,921,677 B1
(45) Date of Patent: Dec. 30, 2014

(54) TECHNOLOGIES FOR AIDING IN MUSIC COMPOSITION

(71) Applicant: Frank Michael Severino, Jackson Heights, NY (US)

(72) Inventor: Frank Michael Severino, Jackson Heights, NY (US)

( * ) Notice: Subject to any disclaimer, the term of this patent is extended or adjusted under 35 U.S.C. 154(b) by 0 days.

(21) Appl. No.: 13/922,470

(22) Filed: Jun. 20, 2013

Related U.S. Application Data

(60) Provisional application No. 61/735,273, filed on Dec. 10, 2012.

(51) Int. Cl.
    *G09B 15/08*     (2006.01)
    *G09B 15/02*     (2006.01)

(52) U.S. Cl.
    CPC ..................................... *G09B 15/02* (2013.01)
    USPC ........................................................... 84/478

(58) Field of Classification Search
    CPC ....................................................... G09B 15/02
    USPC ........................................................... 84/478
    See application file for complete search history.

(56) References Cited

U.S. PATENT DOCUMENTS

| | | | |
|---|---|---|---|
| 3,680,428 A * | 8/1972 | Buckrucker et al. ......... | 84/471 R |
| 4,474,098 A * | 10/1984 | Pepersack et al. .............. | 84/609 |
| 4,479,416 A | 10/1984 | Clague | |
| 4,510,840 A | 4/1985 | Inami et al. | |
| 4,646,609 A * | 3/1987 | Teruo et al. ..................... | 84/615 |
| 5,129,303 A | 7/1992 | Coles | |
| 5,153,829 A * | 10/1992 | Furuya et al. ................... | 84/622 |
| 6,191,349 B1 * | 2/2001 | Flam ................................ | 84/609 |
| 6,313,385 B1 * | 11/2001 | Beatty .......................... | 84/470 R |
| 6,476,304 B2 * | 11/2002 | Uehara .............................. | 84/600 |
| 6,660,921 B2 * | 12/2003 | Deverich ..................... | 84/470 R |
| 6,740,802 B1 * | 5/2004 | Browne, Jr. ..................... | 84/609 |
| 7,423,213 B2 * | 9/2008 | Sitrick ........................ | 84/477 R |
| 7,576,280 B2 * | 8/2009 | Lauffer ............................ | 84/626 |
| 7,589,271 B2 * | 9/2009 | Jarrett et al. .................... | 84/601 |
| 7,608,773 B2 * | 10/2009 | Deverich ..................... | 84/470 R |
| 7,612,278 B2 * | 11/2009 | Sitrick et al. .................... | 84/609 |
| 7,714,222 B2 * | 5/2010 | Taub et al. ....................... | 84/600 |
| 7,754,955 B2 * | 7/2010 | Egan .............................. | 84/600 |
| 7,838,755 B2 | 11/2010 | Taub et al. | |
| 8,008,566 B2 | 8/2011 | Walker, II et al. | |
| 8,035,020 B2 * | 10/2011 | Taub et al. ....................... | 84/600 |

(Continued)

OTHER PUBLICATIONS

VAMP A Voice Activated Music Processor, Babic et al., Worcester Polytechnic Institute, Dec. 18, 1988. Regards use of voice recognition in a computer music application. viewed Jul. 16, 2014.*

*Primary Examiner* — Robert W Horn
(74) *Attorney, Agent, or Firm* — Goldstein Law Offices, P.C.

(57) ABSTRACT

Technologies for in aiding music composition are disclosed. One technology includes receiving, via a computer, at least one of a spoken musical note symbol identifier and a spoken musical notation symbol identifier; identifying, via said computer, at least one of a musical note symbol corresponding to received said spoken musical note symbol identifier and a musical notation symbol corresponding to received said spoken musical notation symbol identifier; causing to display, via said computer, at least one of identified said musical note symbol and said musical notation symbol in musical notation. Another technology includes receiving input from a musical composition keyboard having a musical note key group, a musical note edit key group, a musical miscellaneous key group and a musical notation key group; causing to display musical information on a musical scale in musical notation based at least in part on said input.

5 Claims, 6 Drawing Sheets

(56) References Cited

U.S. PATENT DOCUMENTS

| | | | |
|---|---|---|---|
| 8,530,735 B2 * | 9/2013 | Maebius et al. | 84/612 |
| 8,629,342 B2 * | 1/2014 | Lee et al. | 84/610 |
| 8,692,099 B2 * | 4/2014 | Sitrick | 84/477 R |
| 8,710,343 B2 * | 4/2014 | Kellett et al. | 84/610 |
| 8,754,317 B2 * | 6/2014 | Sitrick et al. | 84/723 |
| 8,875,011 B2 * | 10/2014 | Sitrick et al. | 715/231 |
| 2005/0126368 A1 * | 6/2005 | Harrison | 84/471 R |
| 2008/0060499 A1 * | 3/2008 | Sitrick | 84/477 R |
| 2008/0060507 A1 * | 3/2008 | Welchering | 84/645 |
| 2008/0190271 A1 * | 8/2008 | Taub et al. | 84/645 |
| 2010/0212478 A1 * | 8/2010 | Taub et al. | 84/645 |
| 2011/0224969 A1 | 9/2011 | Mulligan et al. | |
| 2012/0057012 A1 * | 3/2012 | Sitrick et al. | 348/77 |
| 2013/0133506 A1 * | 5/2013 | Daisy | 84/455 |

\* cited by examiner

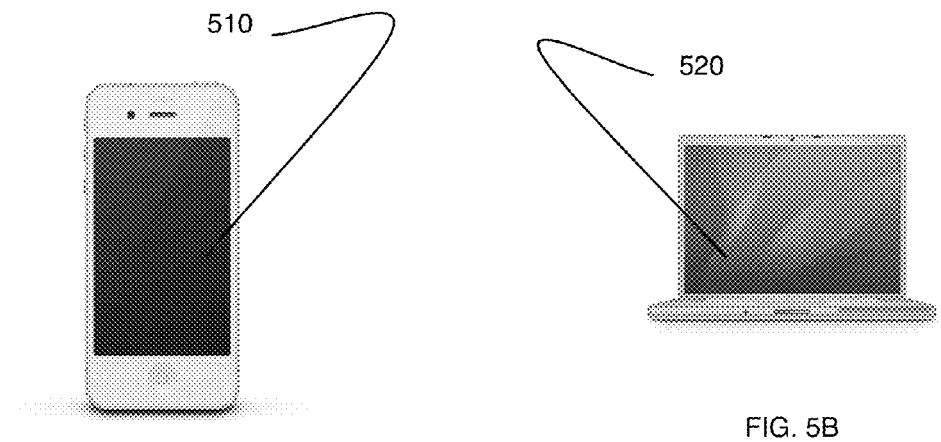
FIG. 5A
FIG. 5B
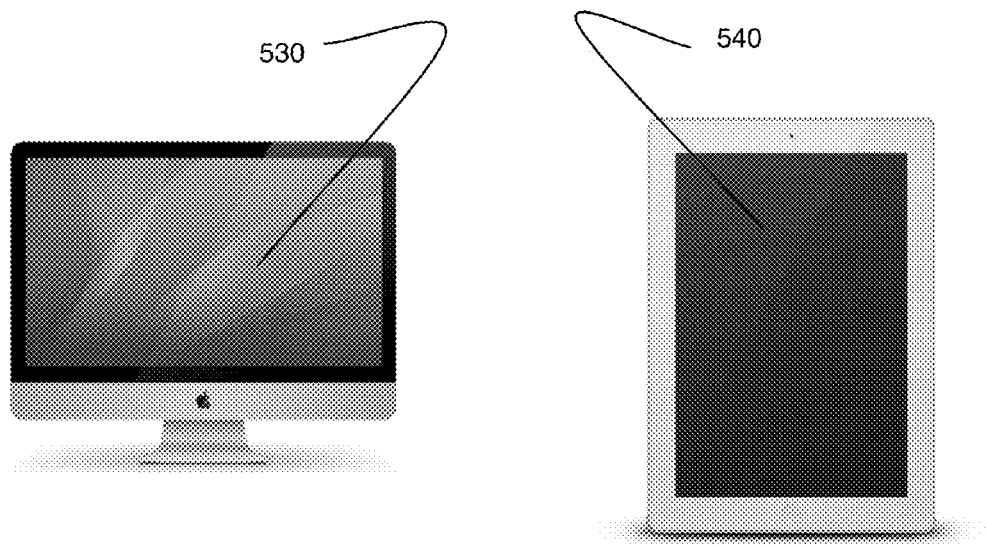
FIG. 5C
FIG. 5D

TECHNOLOGIES FOR AIDING IN MUSIC COMPOSITION

CROSS-REFERENCE TO RELATED APPLICATIONS

This application claims priority to U.S. Provisional Patent Application Ser. No. 61/735,273, filed on Dec. 10, 2012, which is herein incorporated by reference in its entirety for all purposes as if fully set forth herein.

TECHNICAL FIELD

Generally, the present disclosure relates to musical composition. More particularly, the present disclosure relates to technologies for aiding in music composition.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, the discussion should be understood that these statements are to be read in this light, and not as admissions of prior art. Likewise, in the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

Many people desire to compose music. However, transcribing a musical idea from a mental realization to an audible sequence requires practice, patience and discipline. For example, a composer typically creates a musical piece by notating symbolic representations of musical notes and/or musical notations on staff paper. The composer plays a few notes on a music instrument, pauses to write those notes and/or notations down on the staff paper, plays a few more notes on the instrument, pauses again to write those notes and/or notations on the staff paper and iterates such steps until the composer decides that the piece is finished. This can be time consuming, arduous and inconvenient.

Although music sequencers and/or sound synthesizers have made music composition somewhat easier, obstacles still exist. For example, manual input devices can be unintuitive for music synthesizing, especially when they emulate translation from a piano keyboard's mapping to synthesize audible sequences. Similarly, the composer typically possesses a high level of expertise in operating a sequencer and one or more music instruments. However, obtaining such expertise often creates a potential barrier of entry to realizing a creative vision for a would-be musician. Likewise, for visual learners, existing systems are deterring. For example, on pianos and digital sequencers that emulate piano sequencing, unmarked keys hinder development and deployment of an audio and musical sequence. Without specialized knowledge of how to access certain notes on a music instrument, one will be wasting time by inefficiently guessing at their location. In addition, people suffering from medical conditions, such as hand, voice or spine related conditions, often have difficulty composing music.

While certain aspects of conventional technologies have been discussed to facilitate the present disclosure, no technical aspects are disclaimed. The claims may encompass one or more of the conventional technical aspects discussed herein.

BRIEF SUMMARY

The present disclosure addresses at least one of the above. However, the present disclosure may prove useful in addressing other problems and deficiencies in a number of technical areas. Therefore, the claims, as recited below, should not necessarily be construed as limited to addressing any of the particular problems or deficiencies discussed herein.

According to an example embodiment of the present disclosure a method is provided. The method including receiving, via a computer, at least one of a spoken musical note symbol identifier and a spoken musical notation symbol identifier. The method further including identifying, via said computer, at least one of a musical note symbol corresponding to received said spoken musical note symbol identifier and a musical notation symbol corresponding to received said spoken musical notation symbol identifier. The method also including causing to display, via said computer, at least one of identified said musical note symbol and said musical notation symbol in musical notation.

According to another example embodiment of the present disclosure a method is provided. The method including receiving input from a musical composition keyboard having a musical note key group, a musical note edit key group, a musical miscellaneous key group and a musical notation key group. The method further including causing to display musical information on a musical scale in musical notation based at least in part on said input.

According to yet another example embodiment of the present disclosure a system is provided. The system including a computer in communication with a touchscreen and a microphone. Said computer configured to receive music composition input via at least a first method and a second method. Said first method comprising receiving, via said computer as input via said microphone, at least one of a spoken musical note symbol identifier and a spoken musical notation symbol identifier. Said first method further comprising identifying, via said computer, at least one of a musical note symbol corresponding to received said spoken musical note symbol identifier and a musical notation symbol corresponding to received said spoken musical notation symbol identifier. Said first method also comprising causing to display, via said computer on said touchscreen, at least one of identified said musical note symbol and said musical notation symbol in musical notation. Said second method comprising receiving touch input via said touchscreen from a virtual musical composition keyboard having a musical note key group, a musical note edit key group, a musical miscellaneous key group and a musical notation key group. Said second method comprising causing to display on said touchscreen musical information on a musical scale in musical notation based at least in part on said touch input, said scale concurrently displaying with said keyboard.

The present disclosure may be embodied in the form illustrated in the accompanying drawings. Attention is called to the fact, however, that the drawings are illustrative. Variations are contemplated as being part of the disclosure, limited only by the scope of the claims. The above and other features, aspects and advantages of the present disclosure will become better understood to one skilled in the art with reference to the following drawings, detailed description and appended claims.

BRIEF DESCRIPTION OF THE DRAWINGS

The accompanying drawings, which are incorporated into and form a part of the specification, illustrate example embodiments of the present disclosure. Together with the detailed description, the drawings serve to explain the principles of the present disclosure. The drawings are only for the purpose of illustrating example embodiments of the present disclosure and are not to be construed as necessarily limiting the disclosure. Like numbers can refer to like elements throughout. The above and other aspects, advantages and features of the present disclosure will become better understood to one skilled in the art with regard to the following description, appended claims and accompanying drawings where:

FIGS. 5A-5D show various example embodiments of various computers according to the present disclosure.

DETAILED DESCRIPTION OF THE PREFERRED EMBODIMENTS

Figure 1:
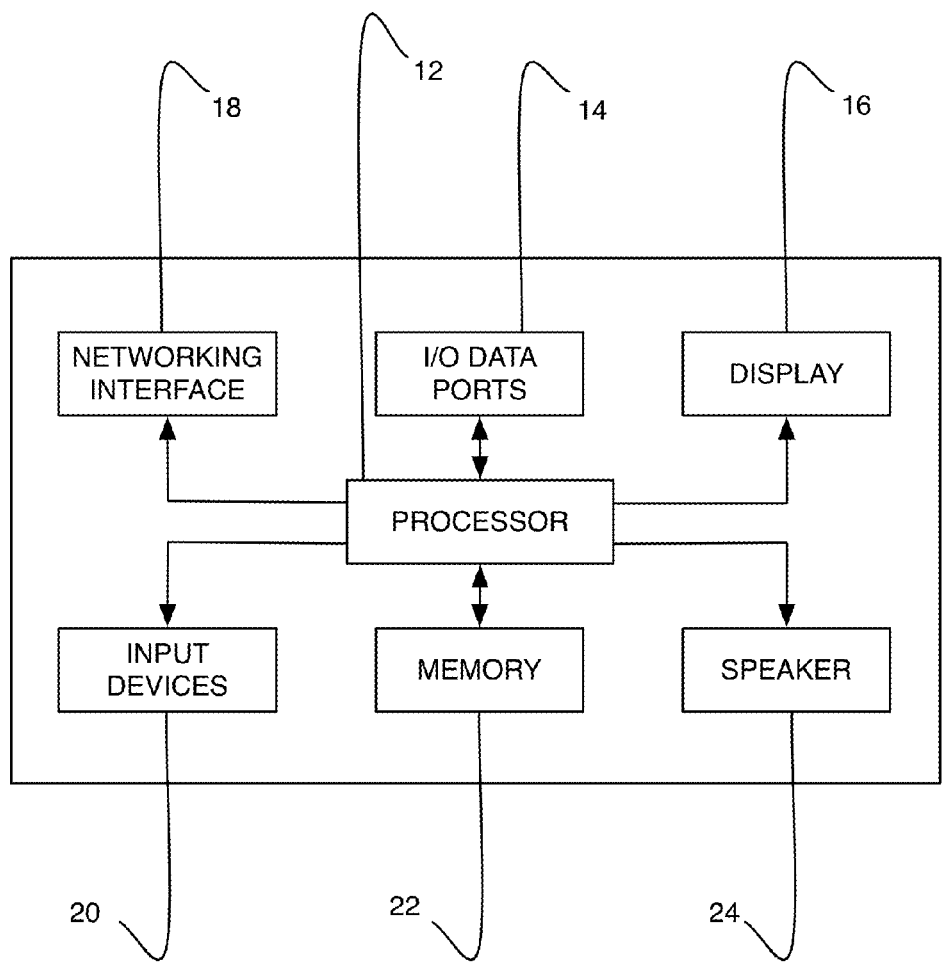
FIG. 1 shows a schematic diagram of an example embodiment of a computer according to the present disclosure.

The present disclosure will now be described more fully with reference to the accompanying drawings, in which example embodiments of the present disclosure are shown. The present disclosure may, however, be embodied in many different forms and should not be construed as necessarily being limited to the embodiments set forth herein. Rather, these embodiments are provided so that this disclosure will be thorough and complete, and will fully convey the concept of the disclosure to those skilled in the art. Also, features described with respect to certain embodiments may be combined in various other embodiments. Different aspects and elements of the embodiments may be combined in a similar manner. The disclosed embodiments may individually or collectively be components of a larger system.

Any verbs as used herein can imply direct or indirect, full or partial, action or inaction. For example, when an element is referred to as being "on," "connected" or "coupled" to another element, then the element can be directly connected or coupled to the other element or intervening elements may be present. In contrast, when an element is referred to as being "directly connected" or "directly coupled" to another element, there are no intervening elements present.

Although the terms "first," "second," etc. may be used herein to describe various elements, components, regions, layers and/or sections, these elements, components, regions, layers and/or sections should not be necessarily limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in the present disclosure, specify the presence of stated features, integers, steps, operations, elements, and/or components, but do not preclude the presence and/or addition of one and/or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to necessarily limit the scope of the present claims. Any and/or all elements can be formed from a same, structurally continuous piece and/or be separately manufactured and/or connected.

Unless otherwise defined, all terms (including technical and scientific terms) used herein have the same meaning as commonly understood by one of ordinary skill in the art to which the present disclosure belongs. The terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The disclosed embodiments may individually and/or collectively be components of at least one and/or more larger systems, wherein one and/or more other procedures may take precedence over and/or otherwise modify their application. Also, a number of steps may be required before, after, and/or concurrently with the disclosed technologies. For example, features described with respect to certain embodiments may be combined in various other embodiments. Different aspects and elements of the embodiments may be combined in a similar manner. Processes disclosed herein can be performed by one and/or more entities in any way according to the principles of the present disclosure.

Some example embodiments of the present disclosure are directed to an intuitive technology for creating music and audible sequences, with a computing device having a display, a microphone and audio sequencing software. In one embodiment, a user makes a tonal sound, which is recorded and translated into a musical note by the software. In a further embodiment, the display displays an on-screen keyboard featuring an array of musical notes and components. The user selects one of the musical notes by shape, such as a half note has a shape of a half note and whole note having a shape of a whole note. Specialized mappings use components of notes to create more complex and intermediary notes. In a further embodiment, the user speaks a name of the note or other musical notation, such as mezzo forte. The software translates the spoken word into a note and displays the note on the display in musical notation, which can then be used to produce sound. In yet a further embodiment, musical information is input via a musical keyboard, each note having its own letter key so that music can be quickly transcribed in musical notation. For example, saying a specific note "B Flat" results in displaying "Bb" by the software, where the specific note may be further placed in a sequencer, such as on staff paper. Similarly, the word "mezzo forte" is displayed simply as "mf". Each note is displayed as its own letter, much like the keys on a QWERTY keyboard. The user would be able to quickly input musical information on the keyboard, such as a touchscreen keyboard. Since the technology does not rely on a piano keyboard configuration or emulation, no prior musical background is necessary.

FIG. 1 shows an example embodiment of a computer according to the present disclosure.

A computer 10 can be mobile or stationary. Computer 10 can be a desktop computer, a laptop computer, a tablet computer, a computer terminal, a computer workstation, a mobile phone, a smartphone, a feature phone, a hardware and/or software logic, a computer emulator, a microcomputer, a programmable machine, a computer system unit, a minicomputer, a mainframe, a supercomputer, a computer system, a computer server, a cloud computing system or any other standalone or non-standalone computer. Computer 10 can be a part of or networked with a larger computer system, whether stationary and/or mobile, or function on its own, whether stationary and/or mobile. Computer 10 can be powered via mains electricity, a portable power source, such as a battery, a renewable energy source, such as a solar cell, or a generator. Computer 10 includes or is coupled to one or more components, such as a processor 12, input/output data ports 14, a display 16, a networking interface 18, input devices 20, a memory 22 and a speaker 24. Computer 10 can be in wired and/or in wireless communication with any and/or all of such components. Computer 10 can include and/or be operably coupled to a sound synthesizer and/or a music instrument, such as a piano, a guitar, a saxophone, a violin, a drum set or any other music instrument, whether via wired and/or in wireless communication. Computer 10 can include and/or be coupled to a hardware music sequencer, whether via wired and/or wireless communication. Computer 10 can run a software music sequencer, music notation software and/or scorewriter software.

Processor 12 is operative to operably communicate, whether substantially simultaneously or non-simultaneously, synchronously or asynchronously, with data ports 14, display 16, networking interface 18, input devices 20, memory 22 and speaker 24. In other embodiments, computer 10 includes several processors 12, whether identical to or different from each other. Processor 12 can be single core, dual core or multi-core.

Ports 14 are operative to input and/or output data, whether wired or wirelessly, synchronously or asynchronously, serially or parallel, to and/or from peripherals, such as memory sticks, joysticks, speakers, microphones or cameras. Ports can be 14 can be two or more, identical or different ports, whether serial or parallel. However, computer 10 can include a single data port as well. For example, ports 14 can be a universal serial bus (USB) port, a Bluetooth® port, a Firewire® port or a Lightening® port.

Display 16 can be a liquid crystal display, a plasma display, an electronic ink display, an electrophoretic display, a light emitting diode display, a cathode ray tube display or a touchscreen display or any other display. Display 16 can be of any size according to principles of the present disclosure. Display 16 can be gray-scale, monochrome, color or black/white.

Interface 18 is operative to allow sending, whether wired or wirelessly, and/or receiving, whether wired or wirelessly, of data through one or more communication networks, such as Internet, cellular telephony, short range, such as via Bluetooth®protocol, or long range, such as via 802.x protocols, personal or business, one or more networks.

Input devices 20 can be a keyboard, whether physical or virtual, a microphone, a joystick, a touchpad, a track-pad, a pedal, a mouse, another computer, such as computer 10, or a music instrument.

Memory 22 can include one or more primary storage, secondary storage, tertiary storage and off-line storage. For example, memory 22 can include one or more read only memory (ROM), random access memory (RAM) and hard disk drives. Memory 22 can be flash memory, optical memory or magnetic memory. Memory 22 can store any music related information in any digital file format.

Speaker 24 can include one or more sound emitters operative to emit a sound when activated or instructed.

Figure 2:
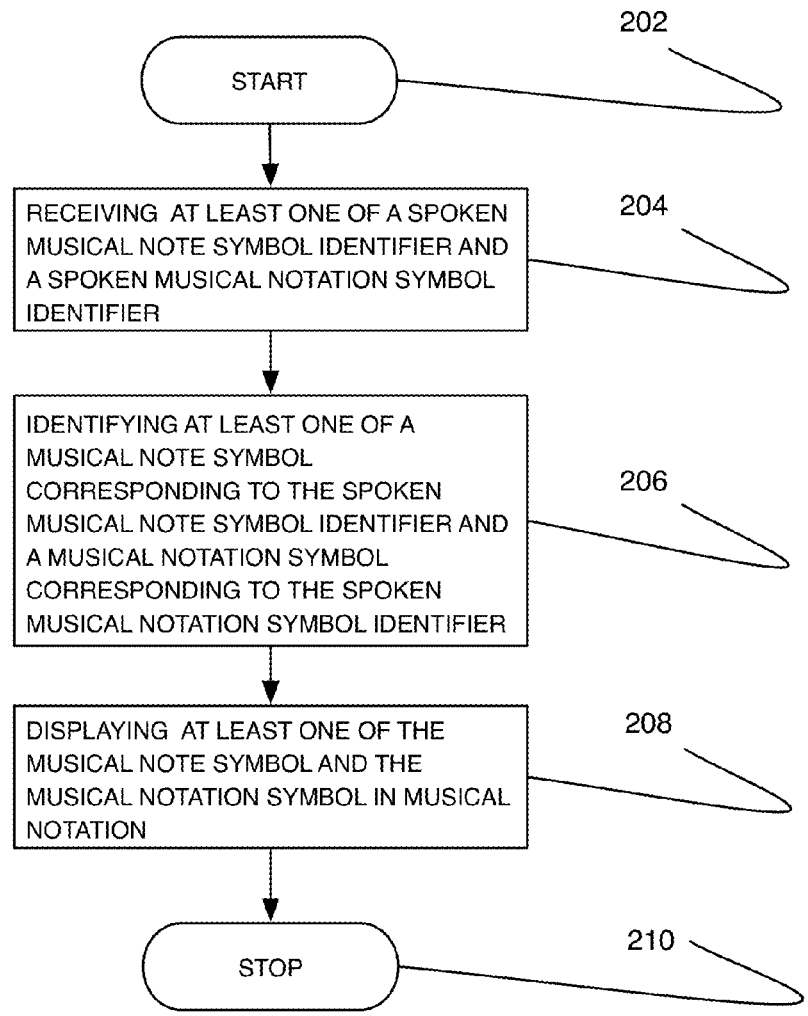
FIG. 2 shows a flowchart of an example embodiment of a process for aiding musical composition according to the present disclosure.

FIG. 2 shows a flowchart of an example embodiment of a process for aiding musical composition according to the present disclosure. Some elements of this figure are described above. Thus, same reference characters identify same or like components described above and any repetitive detailed description thereof will hereinafter be omitted or simplified in order to avoid complication.

A process 200 includes blocks 202-210. Process 200 can be fully or partially performed by computer 10. Process 200 can be based on hardware and/or software logic, whether in one and/or more software applications. Process 200 can be a part of a larger process, irrespective of any relation to music composition or musical notation symbol input. For example, various functions can be taking place before, during and/or after performance of any one or more blocks of process 200, whether on a same or a different machine. Alternatively, process 200 can be performed on its own as well, whether on a same or a different machine.

In block 202, process 200 starts.

In block 204, computer 10 receives at least one of a spoken musical note symbol identifier and a spoken musical notation symbol identifier. For example, a human user speaks at least one of the spoken musical note symbol identifier and the musical notation symbol identifier into a microphone, directly or indirectly, coupled to computer 10. The spoken musical note symbol identifier and/or the musical notation symbol identifier identify by name and/or nickname any modern note and/or musical notation symbol, such as a name of a music note, like Re or F, or a name of a natural music note with an accidental name, like Re sharp or A sharp. Alternatively, the spoken identifiers can be spoken by an intelligent personal assistant and knowledge navigator, such as Apple Siri®. The navigator can use a natural language user based. Also alternatively, the spoken identifiers can be received via a message, such as an email or a text message, whether as an attachment or as part of the message.

Other musical material is possible as well, whether as note identifier and/or notation identifier. For example, lines, like staff, ledger or ledger lines, bar lines, double bar line, bold double bar line, dotted bar line, accolade and/or brace can be used as well. Also for example, clefs, like G clef, C clef, F clef, neutral clef, octave clef and/or tablature can be used as well. Also for example, note and rest values, like double whole note, whole note, half note, quarter note, eighth note, sixteenth note, thirty-second note, sixty-fourth note, beamed notes, dotted notes and/or multi-measure rests can be used as well. Also for example, breaks, like a breath mark and/or a caesura can be used as well. Also for example, accidentals, like flats, sharps, naturals, double flats and/or double sharps can be used as well. Also for example, key signatures, like flat key signatures and or sharp key signatures can be used as well. Also for example, quarter tones, like demiflats, flat-and-a-halfs, demisharps, sharp-and-a-halfs can be used as well. Also for example, time signatures, like specific time—simple time signatures and specific time—compound time signatures, common time, alla breve and/or metronome mark can be used as well. Also for example, note relationships, like ties, slurs, phrase marks, glissandos, tuplets, chords and/or arpeggiated chords can be used as well. Also for example, dynamics, like pianississimo, pianissimo, piano, mezzo piano, mezzo forte, forte, fortissimo, fortississimo, sforzando, fortepiano, crescendo and/or diminuendo can be used as well. Also for example, articulation marks, like staccatos, staccatissimo, accent, tenuto, marcato, left-hand pizzicato, snap pizzicato, natural harmonic, fermata, up bow and/or down bow can be used as well. Also for example, ornaments, like trill, mordent, lower mordent, turn, appoggiatura and/or acciaccatura can be used as well. Also for example, octave signs, like ottava and/or quindicesima can be used as well. Also for example, repetition and codas, like tremolo, repeat signs, simile marks, volta brackets, da capo, dal segno, segno and/or coda can be used as well. Also for example, instrument-specific notations, like for guitar, such as thumb, index, middle, ring and/or little, and/or piano, such as right hand, left hand, finger identifications, engage pedal, release pedal, variable pedal mark, con sordino and/or senza sordino, can be used as well.

Although the spoken musical note symbol identifier and/or the musical notation symbol identifier are described with reference to modern music staff notation based on European classical music, any music notation system and/or any of its components can be used and/or combined herein, regardless of its geographic or historic acceptance and/or variation. For example, specialized notation conventions, like percussion notation, figured bass notation, a lead sheet notation, a chord chart notation and/or shape note notation. Also for example, swara notation, znamenny chant, Chinese musical notation, Shakuhachi musical notation, cipher notation, solfege notation, letter notation, tablature notation, klavar notation, piano roll based notation, 12-note non-equal temperament notation, chromatic staff notation, graphic notation, simplified music notation, parsons code, braille music and/or integer notation can be used as well.

In block 206, computer 10 identifies at least one of a musical note symbol corresponding to the spoken musical note symbol identifier and a musical notation symbol corresponding to the spoken musical notation symbol identifier. The symbols can be stored locally, on computer 10, or remotely. Regardless, computer 10 has sufficient access to enable display of one or more of the symbols. The symbols correspond to any modern musical note and/or musical notation symbol, as disclosed herein. In one example embodiment, the identification can be performed on computer 10. However, in another example embodiment, the identification can be performed via another computer and/or computer system in communication with computer 10. The identification can include matching, mapping and/or translating.

In block 208, computer 10 displays at least one of the musical note symbol and the musical notation symbol in musical notation, such as on a musical scale, on a display coupled to or part of computer 10. The display can be within software music sequencer, music notation software and/or score-writer software. The symbols can be shaped and/or colored for visual distinction to distinguish from other symbols, such as if the other symbols were input via other input methods, or can be shaped and/or colored for visual blending, such as having all symbols displayed in musical notation having an identical color. Also, at least one of the symbol can be cut, copied and/or paste, whether manually, such as via a mouse and/or a keyboard, or through use of voice recognition software, throughout the musical scale displayed via computer 10.

Any type of music composition, such as musical pieces, symphonies, songs, instrumentals and/or choirs, can be input via process 200. Also, when such notes are displayed, as vocally input as described herein, then the notes are automatically entered based on current music register. For example, if the user input a Bb major chord, then this chord the following D chord would automatically be placed on the following note which could be D or any neighbor note on the proper register of the staff paper. Also, such automatic entering can be user selected, such as via voice or software application operation, according to a default format. For example, the user can select a default register into which the new notes are entered. The default register can be the current register, such as the register of the latest entered note.

Figure 3:
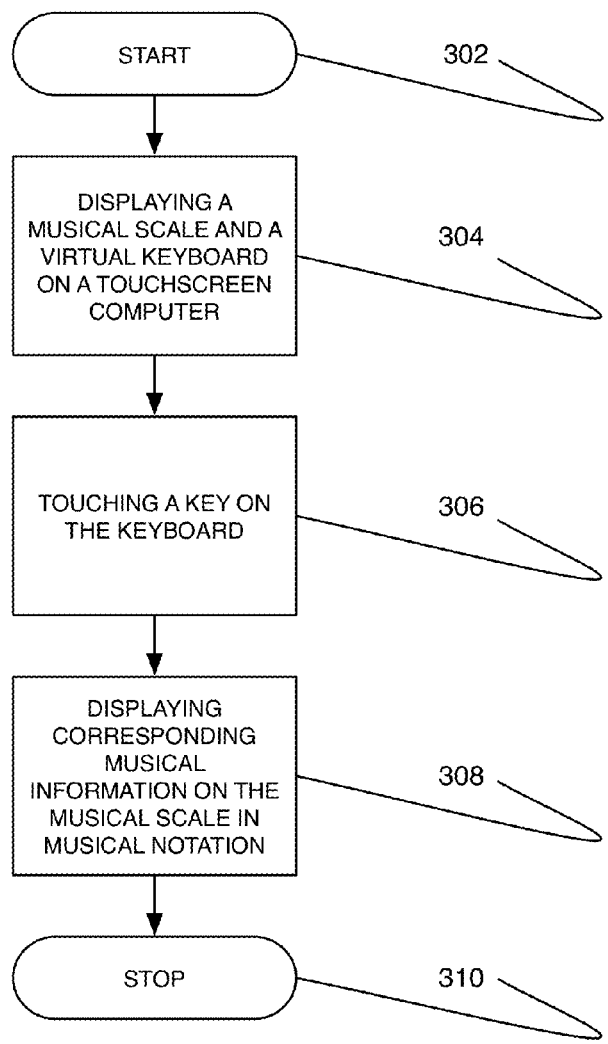
FIG. 3 shows a flowchart of another example embodiment of a process for aiding musical composition according to the present disclosure.

FIG. 3 shows a flowchart of another example embodiment of a process for aiding musical composition according to the present disclosure. Some elements of this figure are described above. Thus, same reference characters identify same or like components described above and any repetitive detailed description thereof will hereinafter be omitted or simplified in order to avoid complication.

A process 300 includes blocks 302-310. Process 300 can be fully or partially performed by computer 10. Process 300 can be based on hardware and/or software logic, whether in one and/or more software applications, irrespective of any relationship to voice input methods, as described herein. Process 300 can be a part of a larger process, irrespective of any relation to music composition or musical notation symbol input. For example, various functions can be taking place before, during and/or after performance of any one or more blocks of process 300, whether on a same or a different machine. Alternatively, process 300 can be performed on its own as well, whether on a same or a different machine. Also alternatively, process 300 can be performed before, during and/or after performance of any one or more blocks of process 200, whether on a same or a different machine.

In block 302, process 300 starts.

In block 304, a musical scale and a virtual keyboard is displayed via a software application running on a touchscreen computer, such as computer 10. The scale can be any musical scale and can be empty or have other notes thereon, irrespective of how those notes got there. The scale can be in any position with respect to the displayed keyboard, such as above, below, diagonal or on a side. The keyboard has a plurality of keys including musical note keys alphanumerically mapped to musical notes symbols and musical notation keys representatively mapped to musical notation symbols. For example, the musical note keys alphanumerically mapped to the musical notes can be keys labeled C or F. Also for example, the musical notation keys representatively mapped to the musical notation symbols can be keys symbolically labeled as a half note, a quarter note, an eight note, a flat, a sharp and/or a time signature and other known musical notation symbols. The musical note keys can be displayed on one part of the touchscreen, as one group, and the musical notation symbol keys can be displayed on another part of the touchscreen, as another group. However, other keyboard layouts, such as mixing and matching, are possible as well. Also, the note keys and/or the notation keys can be mapped via words, nicknames, letters, numbers, symbols and/or other mapping methods.

In block 306, a user, such as a human user, touches a key on the keyboard as displayed via the software application on the touchscreen. Note that touch is not the only way to select key on the virtual keyboard. The keys can also be selected via one and/or more input devices, such as a mouse, a physical keyboard, a stylus, a microphone using voice recognition software, a scrolling ball and/or others.

In block 308, the software application displays corresponding musical information on the scale on the touchscreen in musical notation in response to touching at least one of the keys. The keys can be touched substantially simultaneously and/or non-simultaneously. One or more musical stanzas and/or one or more musical sequences can be composed and/or input this way. The musical information in musical notation and the keyboard are displayed together on a same screen. However, the musical information and the keyboard can be displayed separately, on a same or different screen.

Any type of music composition, such as musical pieces, symphonies, songs, instrumentals and/or choirs, can be input via process 300. Also, when such notes are displayed, as touch input as described herein, then the notes are automatically entered based on current music register. For example, if the user input a Bb major chord, then this chord the following D chord would automatically be placed on the following note which could be D or any neighbor note on the proper register of the staff paper. Also, such automatic entering can be user selected, such as via voice, touch input or software application operation, according to a default format. For example, the user can select a default register into which the new notes are entered. The default register can be the current register, such as the register of the latest entered note.

Figure 4:
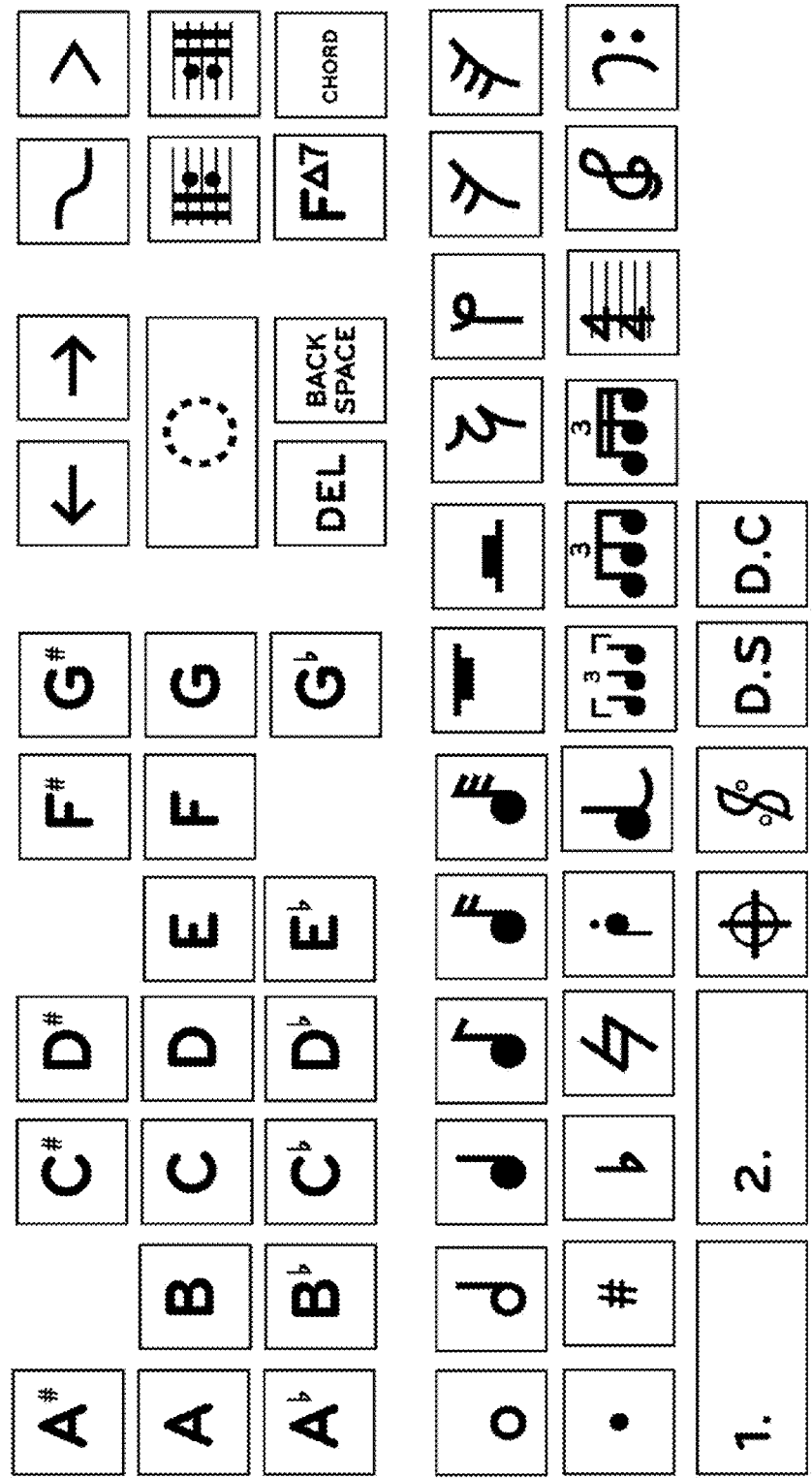
FIG. 4 shows a top view of an example embodiment of a virtual keyboard according to the present disclosure.

FIG. 4 shows a top view of an example embodiment of a virtual keyboard according to the present disclosure. Some elements of this figure are described above. Thus, same reference characters identify same or like components described above and any repetitive detailed description thereof will hereinafter be omitted or simplified in order to avoid complication.

The keyboard as described herein can have a virtual keyboard layout 400. However, other virtual keyboard layouts are possible as well. For example, any permutation of layout 400, whether per key or per key group, can be used. Also, layout 400 can be combined with other musical keyboard layouts in any way. Also, layout 400 can be a part of a larger keyboard layout. Any combination with conventional word processing keyboard layouts of any language, such as English, Russian, Mandarin, Hebrew, Arabic, AZERTY, QWERTY and/or others, can also be used. Symbols depicted in layout 400 are known to those of skilled in music art. The symbols on any of keys 400 can dynamically change their display based on current musical input and/or selection. Alternatively, layout 400 can be inoperative for word processing typing and/or numerical and/or mathematical typing. Note that layout 400 can be embodied in a physical keyboard as well. Layout 400 can be displayed via one and/or more monitors in any way.

Layout 400 includes a plurality of keys arranged in a plurality of groups. For example, as shown in FIG. 4, layout 400 includes a musical note group, a musical note edit group, a musical miscellaneous group disposed over a musical notation group. However, other group arrangements in any permutation thereof can be used as well, such as the musical notation group being disposed over or lateral to the musical note group, the musical note edit group and the musical miscellaneous group.

The musical note group includes a plurality of musical note keys for one octave arranged in a top row, a middle row and a bottom row. The top row includes musical note keys corresponding to musical notes adjacent to sharp symbols, such as musical note majors. The middle row includes musical note keys corresponding to plain musical notes. The bottom row includes musical note keys corresponding to musical notes adjacent to flat symbols, such as musical note minors.

The musical edit group includes a plurality of musical edit keys arranged in a top row, a middle row and a bottom row. The top row including a left arrow key, which represents an undo functionality, and a right arrow key, which represents a redo functionality. The middle row including a highlight key, which allows for highlighting of a musical scale section upon pressing and manually selecting the musical section. The bottom row includes a delete key, which allows for deletion functionality, similar to a word processing delete functionality, and a backspace key, which moves a display cursor back by at least one position and deletes the musical character/symbol at that position, and shifts back the musical information after that position by one position.

The musical miscellaneous group includes a slur key, an accent key, a first repeat sign key, a second repeat sign key, and a musical composition change key, which can allow for a chord change. For example, as shown, the key depicts a symbol for a change of chord from the F key into a major based on $7^{th}$ note, which has 4 notes. The musical miscellaneous group also includes a chord key which allows a user to input, via typing, what chord should be played over a musical measure, which is beat related.

The musical notation group includes a plurality of keys arranged in a top row, a middle row and a bottom row. The top row includes various symbols known to those skilled in the art. For example, such keys can include keys related to clefs, notes, rests, accidentals, key signatures, time signatures, note relationships, dynamics, articulation marks, ornaments, octave signs, repetition, codas, instrument specific notations and/or other musical symbols known to those skilled in the art.

FIGS. 5A-5D show various example embodiments of various computers according to the present disclosure. Some elements of this figure are described above. Thus, same reference characters identify same or like components described above and any repetitive detailed description thereof will hereinafter be omitted or simplified in order to avoid complication.

Any computer displayed in FIGS. 5A-5D can include and/or be operably coupled to a sound synthesizer and/or a music instrument, such as a piano, a guitar, a saxophone, a violin, a drum set or any other conventional music instrument. Any computer displayed in FIGS. 5A-5D can include and/or be operably coupled to a hardware music sequencer. Any computer displayed in FIGS. 5A-5D can be operative to run a software music sequencer, music notation software and/or score-writer software. Although computers displayed in FIGS. 5A-5D can be personal computers, the computers displayed in FIGS. 5A-5D can be business or recreational computer or used for business or recreational purposes. Other computers or other types of computers can also be used as well.

FIG. 5A displays computer 10 embodied as a smartphone 510 operative to perform method 200 and/or 300, substantially simultaneously or non-simultaneously. Smartphone 510 can run any operating system, such as iOS®, Android®, Windows®, Linux®, Unix® or any other operating system. Smartphone 510 can run a software application to display keyboard layout 400. Smartphone 510 can include a touchscreen.

FIG. 5B displays computer 10 embodied as a laptop computer 520 operative to perform method 200 and/or 300, substantially simultaneously or non-simultaneously. Computer 520 can run any operating system, such as iOS®, Android®, Windows®, Linux®, Unix® or any other operating system. Computer 520 can run a software application to display keyboard layout 400. Computer 520 can include a touchscreen.

FIG. 5C displays computer 10 embodied as a desktop computer 530 operative to perform method 200 and/or 300, substantially simultaneously or non-simultaneously. Computer 530 can run any operating system, such as iOS®, Android®, Windows®, Linux®, Unix® or any other operating system. Computer 530 can run a software application to display keyboard layout 400. Computer 530 can include a touchscreen.

FIG. 5D displays computer 10 embodied as a tablet computer 540 operative to perform method 200 and/or 300, substantially simultaneously or non-simultaneously. Computer 540 can run any operating system, such as iOS®, Android®, Windows®, Linux®, Unix® or any other operating system. Computer 540 can run a software application to display keyboard layout 400. Computer 540 can include a touchscreen.

Figure 6:
FIG. 6 shows an example embodiment of a musical piece as displayed on a computer according to the present disclosure.

FIG. 6 shows an example embodiment of a musical piece as displayed on a computer according to the present disclosure. Some elements of this figure are described above. Thus, same reference characters identify same or like components described above and any repetitive detailed description thereof will hereinafter be omitted or simplified in order to avoid complication.

Display 600, which can be a touchscreen or non-touchscreen, displays a musical notation of a musical piece input via technology disclosed herein. For example, method 200 and/or method 300 can be used to input musical notes and/or musical notation symbols to form musical stanzas, as shown in FIG. 6. Computer 10 includes or is coupled to display 600. Computer 10 can play the musical piece after displaying, as disclosed herein. The musical notation can be concurrently displayed with layout 400.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as Java, Smalltalk, C#, C++ or the like, and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, those skilled in the art, both now and in the future, may make various improvements and enhancements which fall within the scope of the claims which follow. These claims should be construed to maintain the proper protection for the disclosure first described.

What is claimed is:

1. A method, comprising:
    receiving, via a computer, at least one of a spoken musical note symbol identifier and a spoken musical notation symbol identifier;
    identifying, via said computer, at least one of a musical note symbol corresponding to received said spoken musical note symbol identifier and a musical notation symbol corresponding to received said spoken musical notation symbol identifier;
    causing to display, via said computer, at least one of identified said musical note symbol and said musical notation symbol in musical notation, wherein at least one of displayed said musical note symbol and said musical notation symbol is visually distinct from another displayed music symbol as input via an input method other than speech.

2. The method of claim 1, wherein said musical notation symbol identifier is based in part at least on a European classical music system.

3. The method of claim 1, wherein said identifying is performed locally on said computer.

4. The method of claim 1, wherein said identifying is performed remotely with respect to said computer.

5. The method of claim 1, further comprising:
    recognizing, via said computer, spoken communication indicative to perform at least one of cut, copy and paste of at least one of displayed said musical note symbol and said musical notation symbol in musical notation.

* * * * *